United States Patent [19]

Gaiser et al.

[11] 3,710,021

[45] Jan. 9, 1973

[54] CIRCUIT ARRANGEMENT FOR THE CONNECTION OF A LOW VOLTAGE DIRECT CURRENT DATA TRANSMISSION SYSTEMS TO A DATA EXCHANGE

[75] Inventors: Rainer Gaiser; Ekkehard Riedel; Lothar Schmid, all of Munich, Germany

[73] Assignee: Siemens Aktiengesellschaft, Berlin, Germany

[22] Filed: June 2, 1970

[21] Appl. No.: 42,728

[30] Foreign Application Priority Data

June 4, 1969 Germany....................P 19 28 434.5

[52] U.S. Cl.......................178/58, 179/16 F, 333/23, 333/28 R

[51] Int. Cl...............................................H04l 11/20

[58] Field of Search................178/50, 58, 59, 60, 52; 333/23, 28; 179/1 C, 2 C, 2 DP, 16 F; 343/175, 176

[56] References Cited

UNITED STATES PATENTS

| | | | |
|---|---|---|---|
| 2,186,006 | 1/1940 | Buckingham | 178/58 |
| 2,272,613 | 2/1942 | Phelps | 178/50 |
| 1,624,023 | 4/1927 | Strieby | 333/28 R |
| 1,746,304 | 2/1930 | Clark | 333/23 |
| 2,387,269 | 10/1945 | Johnson | 333/23 |
| 3,568,100 | 3/1971 | Tarbox | 333/28 R |
| 3,456,206 | 7/1969 | Kwartiroff | 333/28 R |
| 1,570,215 | 1/1926 | Fry | 333/23 |

FOREIGN PATENTS OR APPLICATIONS

| | | | |
|---|---|---|---|
| 1,122,924 | 8/1968 | Great Britain | 179/2 DP |

OTHER PUBLICATIONS

Wire Telegraphy–Signal School Pamphlet No. 5, Signal School, U.S. Army, Fort Monmouth, N.J., Aug. 1931, pp. 43–59

*Primary Examiner*—Kathleen H. Claffy
*Assistant Examiner*—David L. Stewart
*Attorney*—Birch, Swindler, McKie and Beckett

[57] ABSTRACT

A circuit arrangement is described for interconnecting data transmission subscribers through a data exchange in a system where low transmission voltages are used. Each subscriber is connected through the exchange over a two-wire line carrying duplex traffic. A matching network is provided adjusting the electrical length of each subscriber line on the arriving side of the exchange to correspond with the longest existing line.

5 Claims, 2 Drawing Figures

CIRCUIT ARRANGEMENT FOR THE CONNECTION OF A LOW VOLTAGE DIRECT CURRENT DATA TRANSMISSION SYSTEMS TO A DATA EXCHANGE

BACKGROUND OF THE INVENTION

This invention relates to data transmission systems wherein data signals are transmitted in the form of low voltage, direct current signals. Such systems utilize a data exchange having a plurality of incoming and outgoing transmission lines connected thereto, and the subscribers are interconnected through the exchange.

Direct current telegraphy is a well known means for the transmission of data. In many such prior art systems high line currents and transmission voltages are used. For example, a neutral current of 40 milliamperes at 120 volts or a polar current of ± 20 milliamperes at 60 volts are often used. At these current and voltage levels, however, duplex traffic, i.e. simultaneous transmission in both directions, can favorably occur only when a four wire transmission line is used. The transmission rates for such prior art systems are limited to approximately 200 Baud. A reason for this is that the mechanical relays used in such systems generally cannot operate at high speeds in a distortion-free manner. In such systems the transmission rate is further limited by the fact that cross-talk signals are coupled between adjacent circuits. The noise voltages which are coupled to adjacent circuits are proportional to the transmission voltage and become greater as the transmission rate increases because the cross-talk attenuation decreases with increasing frequency. Further, with an increased transmission rate the coupled noise signal will probably be in the frequency range of speech transmission signals so that such cross-talk can be especially disturbing when data transmission circuits are adjacent telephone circuits.

The problems discussed hereinabove gave rise to the development of an all-electronic direct current data transmission system utilizing the the double current principle and which is capable of operating at transmission rates of up to 4800 Baud. An example of such a system is described in U.S. Pat. No. 3,413,413. The transmission voltages in such systems are approximately ± 0.3 volts, and the noise voltages generated in adjacent lines remain below permissible limits. The output terminals of the transmitters and the receivers are all above ground potential, and balanced line transmission networks are used. By the latter means, the transmission lines are insensitive to coupled noise voltages, despite the fact that low transmission voltages are used.

As was discussed hereinabove, it has been impossible to have interference-free duplex traffic on the known, prior art direct current transmission systems. In the newer system described immediately above, however, it has been discovered that duplex traffic may be carried on in a two-wire system. In the context of this application the term duplex traffic refers to simultaneous transmissions in both directions over the same transmission line. In order to have such duplex traffic in the newer system each data station interposed between two subscribers must include a line balancing network which is tuned to the electrical length of the line segment between the two connected subscribers. In such a connection arrangement a desirable line balance using a balancing network occurs when the internal impedance of the data station is mismatched with the transmission line in such a manner that the data station internal impedance is lower. In this case the result is that the line balance of the balancing network in the data station is independent from that of the others.

A problem arises in data transmission systems such as those described immediately above if an exchange station for the interconnection of the subscribers is interposed into the system. As discussed hereinabove, the calling subscriber transmits his signals with low voltage, direct current. In the known exchange stations switching means are used which are not capable of switching low voltage direct current data signals. Thus it is necessary to connect a data station ahead of the exchange which contains a receiver for the low voltage, direct current signals and produces a high voltage signal which may then be connected to the exchange for switching. At the output of the exchange, the high voltage signal is converted into a low voltage transmission signal, and is coupled to another data station having a transmitter for transmission of the data signal to the desired subscriber. Therefore, in view of the need for line balancing at a data station, at the input of and at the output of the exchange, a line balancing network is required.

A most recent development in the field of direct current data transmission has been the development of an exchange station which includes switching means capable of operating on the low direct current voltages which are used for data transmission in the modern systems discussed hereinabove.

In the data transmission area a well known phenomenon is that of "traffic concentration." That is, for a plurality of subscribers connected to an exchange the number of lines departing from the exchange for long distance traffic can be smaller than the number of lines connecting subscribers to the exchange. Statistical determinations have shown that for long distance traffic the number of lines departing from the exchange may be as little as 25 to 30 percent of the number of subscriber lines connected to the arriving side of the exchange. The corresponding reductions in cost and complexity as a result of this phenomenon make it a desirable effect, but there are significant problems if it is desired that two wire duplex traffic should be used. In the latter case it is necessary that the line balancing networks in each transmission line between data stations or subscribers be properly tuned to the electrical length of the line involved. However, because fewer data stations are present on the departing side of the exchange, an individual switching network or matrix is necessary which contains a number of line balancing networks corresponding to the number of subscriber lines on the arriving line side of the exchange, and these different balancing networks are permanently set to a fixed value. Upon the connection of a subscriber, the line balancing network associated therewith is connected. It can be seen that the need for such a switching matrix significantly increases the complexity and cost of such a system.

It is therefore an object of this invention to provide a circuit for low voltage, direct-current data transmission systems wherein the cost and complexity of the circuitry is significantly reduced.

It is another object of this invention to provide a circuit arrangement for low voltage, direct current data transmission systems wherein exchange systems having switching means capable of operating on the low voltage data signals may be used, and particularly in such systems wherein the number of subscriber lines connected to the arriving line side of the exchange exceeds the number of departing or long distance line.

SUMMARY OF THE INVENTION

The foregoing an other objects are accomplished in a data transmission system constructed according to the principles of the invention defined herein wherein each subscriber possesses a transmission and receiving system and is connected over a two-wire transmission line with an exchange station. In each transmission line connecting a subscriber to the exchange a matching network is interposed, and all such matching networks are balanced or tuned to the electrical length of the longest existing connection line between a subscriber and the exchange. Further, all balancing networks in the data transmitting stations on the departing line side of the exchange are permanently tuned to the electrical length of the longest existing of said subscriber lines. Each of the aforementioned matching networks are adjusted only once so that each of them are set to the same value. Furthermore, the line balancing network in the data stations are permanently set to a given value so that difficult and costly balancing is eliminated. The circuit arrangement according to the principles of this invention is a considerably simplified arrangement so that a system of significantly reduced cost and complexity is realized.

BRIEF DESCRIPTION OF THE DRAWINGS

The principles of the invention described herein may be best understood by reference to the description of a preferred embodiment given hereinbelow in conjunction with the drawings in which.

DETAILED DESCRIPTION OF THE DRAWINGS

Figure 1:
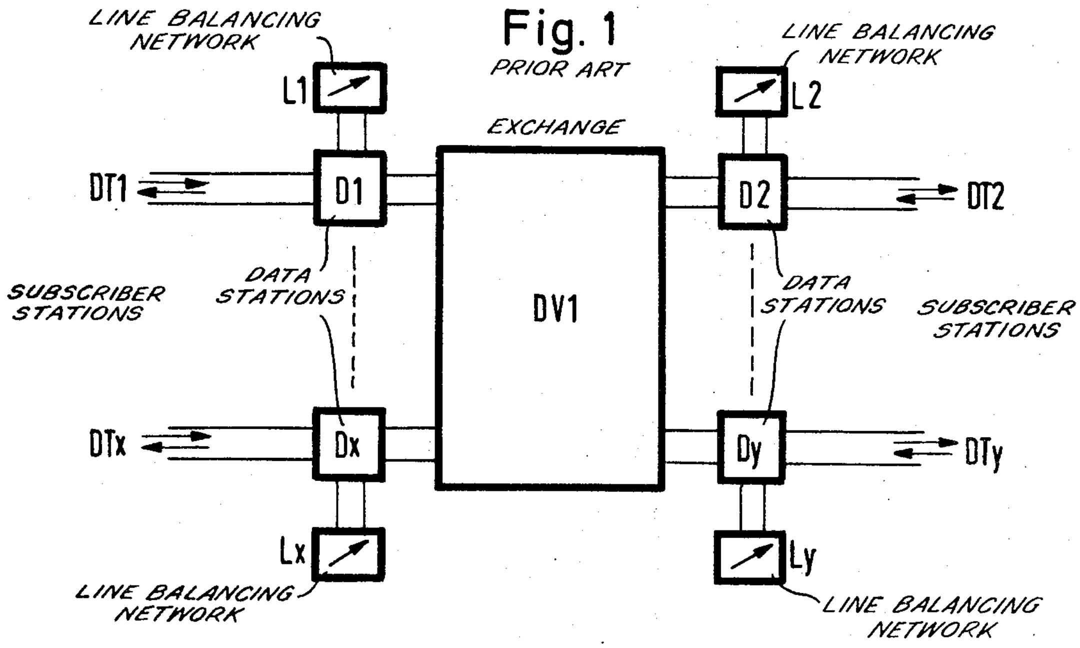
Fig. 1 PRIOR ART
FIG. 1 is a schematic block diagram of a prior art circuit arrangement for a low voltage, direct current data transmission system

In FIG. 1 each subscriber station DT1 – DT*y* contains a data transmitting and receiving means for low voltage, direct current data transmission. In the description of this prior art circuit a connection of DT1 to DT2 will be discussed, but stations DT*x* and DT*y* may be interconnected in the same way. An exchange station DV1 is interposed between the subscriber stations to be connected, and it contains the well-known switching elements usually found in such exchange stations for the interconnection of subscribers. A data station D1 is interposed between subscriber station DT1 and the exchange, and a data exchange station D2 is interposed between the exchange DV1 and subscriber station DT2. The calling subscriber DT1 transmits his transmission signal to the station D1 which receives the direct current signals, converts them into a higher voltage and conveys them to the exchange where the signal is appropriately switched to be coupled to the transmission line connected to data station D2. The data station D1 contains only conventional devices for accomplishing the foregoing results, and a further description of them herein is not needed. The high voltage signal needed for operation by the exchange is converted therein to a low voltage, direct current signal either at the output of the exchange DV1 or in the data station D2. The data station D2 in the well known manner transmits the low voltage, direct current data signal to the subscriber station DT2. With the exception of the means for converting the voltage of the data signal to a lower or higher value, the data stations D1 and D2 contain the same transmitting and receiving means which might be found in the subscriber stations DT1 and DT2 because duplex traffic is contemplated and data is being transmitted between the two subscriber stations in both directions.

Because duplex traffic is being used and for the reasons discussed hereinabove, each of the data stations D1 and D2 used for connecting subscribers DT1 and DT2 must have a line balancing network which will make possible this kind of operation over a two-wire transmission line. In each case the line balancing network L1, associated with station D1, and L2 associated with station D2, must be tuned to the electrical length of the lines between the respective data stations and subscribers.

It is to be noted that instead of the data station D2 for transmitting data signals from the exchange to the desired subscriber other long distance transmitting systems may be used, and an example of such a system is the well known long distance alternating current telegraphy system. If the latter form of long distance transmission is used, the conversion of the data signal into a low voltage, direct current signal takes place at a data station in close proximity to the desired subscriber station or in a second exchange station, and the low voltage, direct current signal is appropriately coupled to the desired subscriber station.

Figure 2:
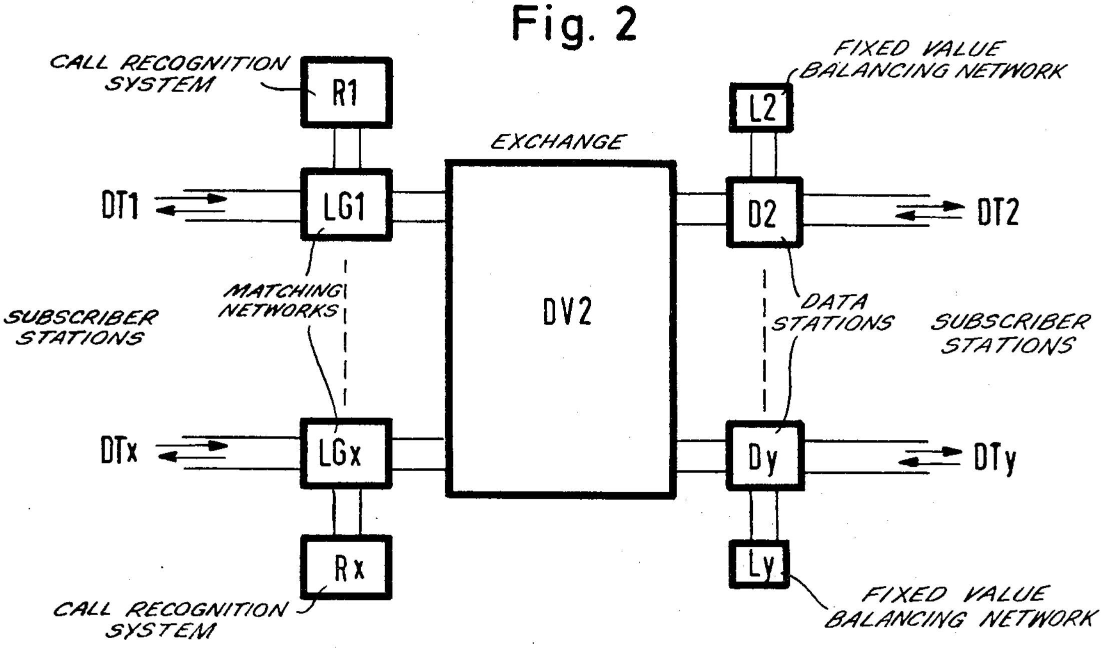
FIG. 2 is a schematic block diagram of a preferred embodiment of a low voltage, direct current data transmission constructed according to the principles of the invention described herein.

FIG. 2 illustrates an embodiment of a data transmission system constructed according to the principles of this invention. In this figure, again, it is contemplated that subscriber station DT1 will be connected to subscriber station DT2, but of course there will be a plurality of stations involved and this is symbolically indicated by the *x* and *y* notations in the lower portions of the Figure. In this embodiment the subscriber stations DT1 and DT2 are of the same form as those described in FIG. 1. The data exchange DV2 is of the type which contains switching means capable of operating on low voltage, direct current signals. The latter exchange contains the more modern, and well known, form of switching element mentioned hereinabove, and the switching operations in the exchange DV2 take place in the well known manner. In the connection arrangement shown data signals originate in subscriber station DT1 and are connected through exchange DV2 to data station D2 and subscriber station DT2. As discussed hereinabove, data station D2 can be replaced within the scope of this invention with other well-known data transmission systems. A suitable exemplary description of the construction of such a data station is to be found in U.S. Pat. No. 3,413,413.

Because exchange DV2 is of the type which can operate on low voltage, direct current signals, it will be noted that the data stations corresponding to the stations D1 in FIG. 1 are no longer needed. However, a matching network LG1 is interposed in the two wire transmission line connecting the subscriber station DT1 to the exchange. This matching network is adjusted so that the transmission line between subscriber station DT1 and the exchange on the arriving line side of the exchange is of an electrical length equal to the electrical length of each of the other lines connecting subscriber stations to the arriving line side of DV2. Each such transmission line contains a matching network similar to LG1. Each such transmission line is tuned so that it has an electrical length corresponding to the electrical length of the electrically longest transmission line connecting a subscriber station to the exchange. The matching networks such as LG1 may comprise, for example, an RC ladder network with component values properly adjusted to achieve the results discussed above. The ladder network forms an artificial line which is connected in series with the two wire line, as shown in the drawings. The component values of the ladder network inserted in each line are adjusted in the known manner to give the line the electrical length discussed above. In the case of the longest line, the artificial line may easily be short circuited. A result of this arrangement is that the data stations, such as D2, are connected to subscribers through transmission lines of equal length so that all of the balancing networks in the data stations D2–D*y* may be of equal and fixed values. Thus, line balancing is no longer necessary in the data stations transmitting signals on the departing line side of the data exchange. This is an especially desirable result in those systems where there are fewer departing than arriving transmission lines so that each data station, e.g. D2, can readily work with any transmitting subscriber in a duplex traffic scheme. This result arises out of the fact that the connection lines have all been adjusted to same electrical length through the matching networks, such as LG1. In order to provide an example of the application of the invention it can be assumed that the subscriber line DT*x* is the line of longest physical length in the FIG. 2 system. For exemplary purposes, it will be assumed that this subscriber line has a physical length of 8 kilometers, and the subscriber line DT1 has a physical length of 2 kilometers. When switching through data exchange system DV2 with the incoming low signal voltage, it is necessary to tune the line sections in data station D1 to the different lengths of the subscriber lines. According to the invention, the balancing networks L2 and L*y* are tuned to the same value; namely, to a value corresponding to a circuit length of 8 kilometers, because this corresponds to the longest subscriber line. However, this requires compensation for the different physical lengths of subscriber lines. Therefore, the invention provides for a matching network, i.e., a section of artificial line, interposed in the shorter subscriber line to increase its electrical length to correspond to the longest line in the system. Thus, because the subscriber line from DT1 is only 2 kilometers, an artificial line LG1 will have to be interposed in this subscriber line in order to simulate an additional 6 kilometers. Because the line from DT*y* is the longest line at 8 kilometers the terminals of the artificial line section therein are short circuited. This example assumed the presence of only two subscriber lines, but obviously, these principles can be applied to any number of lines.

It is known that every transmission line of a given physical length, when driven by an electrical signal of given parameters, will have incident and reflected signals of particular values; thus, the latter values will give the line an electrical length. The artificial line discussed hereinabove, behaves, at its terminals, like a transmission line of equivalent physical length in terms of the aforementioned values, although the actual signals do not exist physically on the artificial line. Therefore, the artificial line, as is known in the art, is said to have an electrical length equal to the equivalent transmission line. The term electrical length is used herein in accordance with this definition.

In view of the fact that in circuit arrangements such as that described above there is no means by which a subscriber may be identified, it is necessary to interpose in each arriving subscriber connection line a call recognition system, R1–R*x*, which communicates to the exchange station a signal indicating which subscriber is calling. So that the call recognition signal can be distinguished from data signals, a transmission voltage of a slightly higher value than the voltage of the data signal is used. Because the call signal can be a very low speed signal, a simple circuit, such as a central exchange register, may be used, and such circuits are well known and need not be described further herein.

A result exemplary of the desirable results of constructing a data transmission system according to the principles of this invention is that it has been shown that with a traffic concentration resulting in a number of departing lines equal to 25 percent of the number of arriving lines, the result is obtained that a 50 percent decrease in costs is realized. This significant decrease in costs occurs because the number of components needed is materially reduced.

The preferred embodiment of a data transmission system constructed according to the principles of the invention described herein is only exemplary, and it will be apparent to those skilled in the art that other structural arrangements, connection schemes and components may be used within the scope of the appended claims. For example, other network configurations may be used to perform the functions of the matching networks LG1–*x* within the scope of the claims.

We claim:

1. Circuit arrangement for the interconnection of low transmission voltage, direct current data transmission systems comprising:

a plurality of data transmission subscriber stations, each station having transmitting and receiving means for low voltage direct current data transmissions over a two wire transmission line, data exchange means capable of switching low voltage, direct current data signals, a plurality of two wire data transmission lines for duplex traffic connecting said subscriber stations to said exchange, data station means interposed in the ones of said transmission lines departing from said exchange means for producing data signals having appropriate values for transmission to the ones of said subscriber stations on the departing line side of said exchange means and a plurality of matching networks, one of which is interposed in each transmission line on the arriving line side of said exchange means for adjusting each said arriving transmission line to the electrical length of the longest existing arriving transmission line thereby making each of said arriving subscriber lines of the same electrical length.

2. The circuit arrangement defined in claim 1 wherein said data station means includes fixed value balancing networks coupled to the transmission lines departing therefrom.

3. The circuit arrangement defined in claim 1 wherein the number of arriving transmission lines to said exchange exceeds the number of departing transmission lines.

4. The circuit arrangement defined in claim 1 comprising in addition call recognition means interposed in each said arriving transmission line for detecting, by means of a signal of a form recognizable from said data signals, a signal identifying the transmitting subscriber station.

5. The circuit arrangement defined in claim 1, wherein each said matching network is an artificial line inserted in series with the transmission line.

* * * * *